US012219229B2

(12) United States Patent
Kim et al.

(10) Patent No.: US 12,219,229 B2
(45) Date of Patent: Feb. 4, 2025

(54) VIDEO CAMERA

(71) Applicant: LG ELECTRONICS INC., Seoul (KR)

(72) Inventors: Youngil Kim, Seoul (KR); Seongcheol Lee, Seoul (KR); Hyunkook Kim, Seoul (KR); Jihun Leem, Seoul (KR); Hansaem Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

(21) Appl. No.: 18/172,880

(22) Filed: Feb. 22, 2023

(65) Prior Publication Data

US 2024/0073501 A1    Feb. 29, 2024

(30) Foreign Application Priority Data

Aug. 25, 2022   (WO) ............... PCT/KR2022/012751

(51) Int. Cl.
*H04N 23/52* (2023.01)
*H04N 23/51* (2023.01)

(52) U.S. Cl.
CPC ............ *H04N 23/52* (2023.01); *H04N 23/51* (2023.01)

(58) Field of Classification Search
CPC ......... H04N 23/00; H04N 23/52; H04N 23/57
See application file for complete search history.

(56) References Cited

U.S. PATENT DOCUMENTS

| 11,971,645 | B2 * | 4/2024 | Goh | ..................... H04N 23/51 |
| 2018/0138607 | A1 * | 5/2018 | Diomedi | ............ H01R 13/5213 |
| 2021/0116976 | A1 * | 4/2021 | Kim | ..................... H04N 23/51 |
| 2022/0342285 | A1 * | 10/2022 | Li | ........................ H04N 23/57 |

FOREIGN PATENT DOCUMENTS

| KR | 10-0924464 | 11/2009 |
| KR | 10-1361297 | 2/2014 |
| KR | 10-2347121 | 1/2022 |
| WO | 2022-170042 | 8/2022 |

OTHER PUBLICATIONS

PCT International Application No. PCT/KR2022/012751, Written Opinion and International Search Report dated May 15, 2023, 9 pages.

* cited by examiner

*Primary Examiner* — Amy R Hsu
(74) *Attorney, Agent, or Firm* — LEE, HONG, DEGERMAN, KANG & WAIMEY

(57) ABSTRACT

Disclosed is a video camera, including a body housing, a camera module mounted on a front side of the body housing, a camera cover selectively opening/closing the camera module, and a cover slider moving the camera cover slidably, the cover slider including a fixed frame fixed to the body housing, a slide rail coupled to the fixed frame, a slide frame moving along the slide rail, and a connecting part fastening the slide rail and the camera cover together.

11 Claims, 19 Drawing Sheets

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

VIDEO CAMERA

Pursuant to 35 U.S.C. § 119, this application claims the benefit of an earlier filing date and right of priority to International Application No. PCT/KR2022/012751, filed on Aug. 25, 2022, the contents of which are hereby incorporated by reference herein in its entirety.

BACKGROUND OF THE DISCLOSURE

Field of the Disclosure

The present disclosure relates to a video camera, and more particularly, to a camera capable of collecting various informations and having no restriction on an installation location. The present disclosure relates to a video camera with an improved freedom degree and an improved fixing force of a stand on which the video camera is mounted.

Discussion of the Related Art

In general, a web camera is attached to a top side of a monitor and may be connected to a computer by providing a USB port, an HDMI port, or the like. It is possible to photograph a user's face from the top side of the monitor, and has been used for video conferences or video calls.

A web camera is generally configured in a manner of being fixed to a top side of a monitor using a member such as a clip. Since a web camera is limitedly configured in a manner of being fastened to an upper part of a monitor, its installation place is limited.

As thickness of a monitor is diverse and a size of a bezel tends to decrease, there are many monitors to which a web camera stand fixed to a monitor top bezel in the form of a clip is not applicable, thereby causing a problem of poor versatility.

In addition, as the number of IOT devices at home has increased recently, home cameras have emerged as cameras to detect users and recognize gestures indoors in addition to the usage of taking pictures of users' faces when computers are used.

Existing home cameras were used to film indoors like CCTV for the purpose of observing pets or children and are installed on tables or ceilings.

In addition, since an environment is being created to conduct non-face-to-face tasks such as video conferencing and telemedicine instead of face-to0face tasks, the demand for video cameras for video conferencing or telemedicine is increasing.

In particular, regarding patients, since a patient who is lying down due to discomfort in movement has difficulty in being diagnosed while sitting in front of a computer monitor, it is difficult to use a web camera installed at a top side of a monitor only or a home camera installed in a manner of being fixed to a ceiling or the like.

There is a need for a video camera that can collect a variety of information and is unrestricted in its installation location.

SUMMARY OF THE DISCLOSURE

Accordingly, embodiments of the present disclosure are directed to a video camera that substantially obviates one or more problems due to limitations and disadvantages of the related art.

Accordingly, embodiments of the present disclosure are directed to a video camera that substantially obviates one or more problems due to limitations and disadvantages of the related art.

One object of the present disclosure is to provide a video camera including a stand that may be mounted in various places.

In particular, one object of the present disclosure is to provide a video camera that can be mounted on a floor, attached to a wall, and mounted on various types of display devices.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a video camera according to one embodiment of the present disclosure may include a body housing, a camera module mounted on a front side of the body housing, a camera cover selectively opening/closing the camera module, and a cover slider moving the camera cover slidably, the cover slider including a fixed frame fixed to the body housing, a slide rail coupled to the fixed frame, a slide frame moving along the slide rail, and a connecting part fastening the slide rail and the camera cover together.

The video camera may include an elastic part having one side fixed to the slide frame and the other side located in the fixed frame, and the elastic part may provide elasticity for switching the camera cover from a middle state of a closed or open state to the open or closed state.

The elastic part may include a torsion spring.

The video camera may include a magnet coupled to the slide frame and a hall sensor overlapping with the magnet in one of a closed state and an open state of the camera cover.

The body housing may include a front case covering a front side having the camera located thereat and the front case may include a slide slit penetrated by the connecting part and having a length corresponding to a distance in which the camera cover slidably moves.

In another aspect of the present disclosure, as embodied and broadly described herein, provided is a video camera including a body housing, a camera module mounted on a front side of the body housing, a printed circuit board located within the body housing so as to have a plurality of communication sockets mounted thereon, and a plurality of socket holes formed in a rear side of the body housing so as to expose a plurality of the communication sockets, each of the socket holes including a first socket hole having a width corresponding to that of the communication socket and a second socket hole having a width smaller than that of the communication socket.

The second hole may include a guide extension portion inserted into an inside of the communication socket from both sides in a width direction of the communication socket.

A thickness of the guide extension portion may correspond to ½ of a width difference between the second socket hole and the communication socket.

The video camera may further include a cable fixture having a plurality of cable holders into which a cable connected to a plug inserted into the socket hole is inserted and an attachment surface attached to a wall or a display device.

The video camera may include a plug connector having a plug portion inserted in the socket hole and a socket portion formed in a vertical direction with respect to the socket hole and having a size corresponding to that of the socket hole.

Accordingly, the present disclosure provides the following effects and/or advantages.

A video camera of the present disclosure may be installed not only on a floor, but also on a monitor or wall, so that it may be easily installed in various places.

In addition, a front side of a camera may be selectively covered, thereby protecting the privacy of the individual.

By implementing communication sockets of different standards as a single communication socket module, types of components may be simplified.

Effects obtainable from the present disclosure may be non-limited by the above-mentioned effects. And, other unmentioned effects can be clearly understood from the following description by those having ordinary skill in the technical field to which the present disclosure pertains.

BRIEF DESCRIPTION OF THE DRAWINGS

The present invention will become more fully understood from the detailed description given herein below and the accompanying drawings, which are given by illustration only, and thus are not limitative of the present invention.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
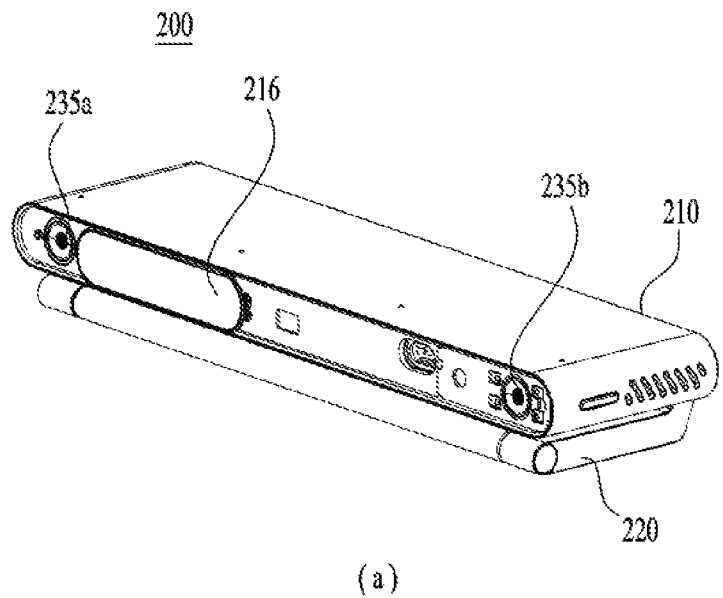
FIG. 1 and FIG. 2 are diagrams showing an installation example of a video camera according to the present disclosure.
Figure 1:
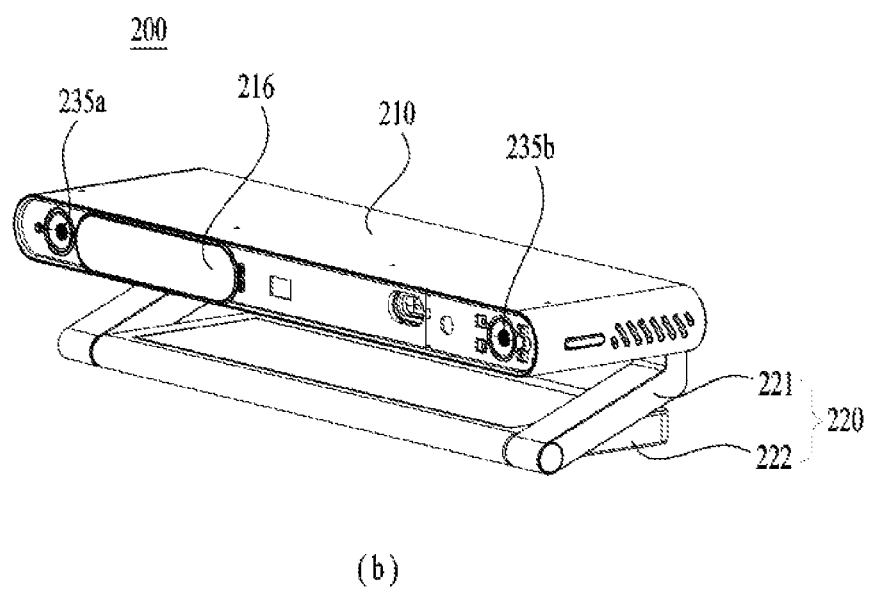

FIG. 1 is a diagram showing a video camera 200 according to the present disclosure. A video camera according to the present disclosure includes a body in a box shape and a stand supporting a bottom side of the body. The body has a camera located on a front side to perform telemedicine, video conference and the like by photographing and transmitting a user's face and the like to a remote place.

To collect more specific information using a plurality of cameras and obtain a sense of perspective such as a human eye using a plurality of cameras, the body may be provided with a long shape in a horizontal direction. The body is implemented thinly to provide an advantage in that the body does not stand out when disposed on a top side of a monitor or the like.

The stand is a device on which the body is mounted. For a conventional web camera, the stand is mainly formed as tongs or a clamp to be fixed to a top side of a monitor. For a home camera, the stand has an angle-adjustable configuration when mounted on a table or attached to a ceiling.

As shown in FIG. 1, the stand of the present disclosure includes a pair of legs and a pair of hinges, and may adjust the height and angle of the body by adjusting the angles of a pair of the hinges. The second leg serves to fix the stand to a mounting surface and the angle and height of the body may be adjusted through the first leg connecting the main body and the second leg.

As shown in FIG. 1(a), while the first leg and the second leg are overlapped, the body is disposed in a manner of adhering to the mounting surface. As shown in FIG. 1(b), the height and angle of the body may be controlled by adjusting the angle between the first leg and the body and the angle between the second leg and the first leg.

The stand including a pair of the legs and a pair of the hinges of the present disclosure minimizes the limitation of an installation location and freely adjusts the height and angle after installation, thereby improving the availability of the video camera.

Figure 2:
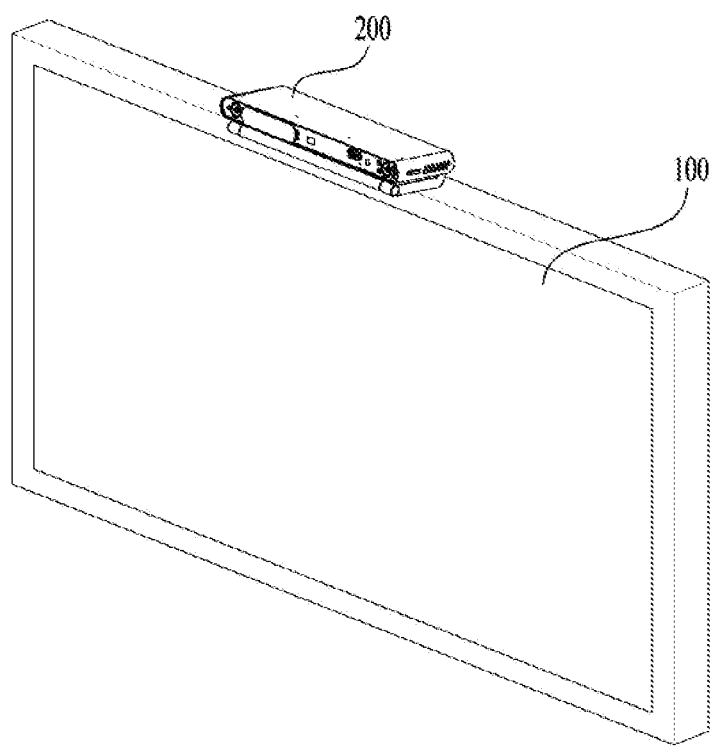
Figure 2:
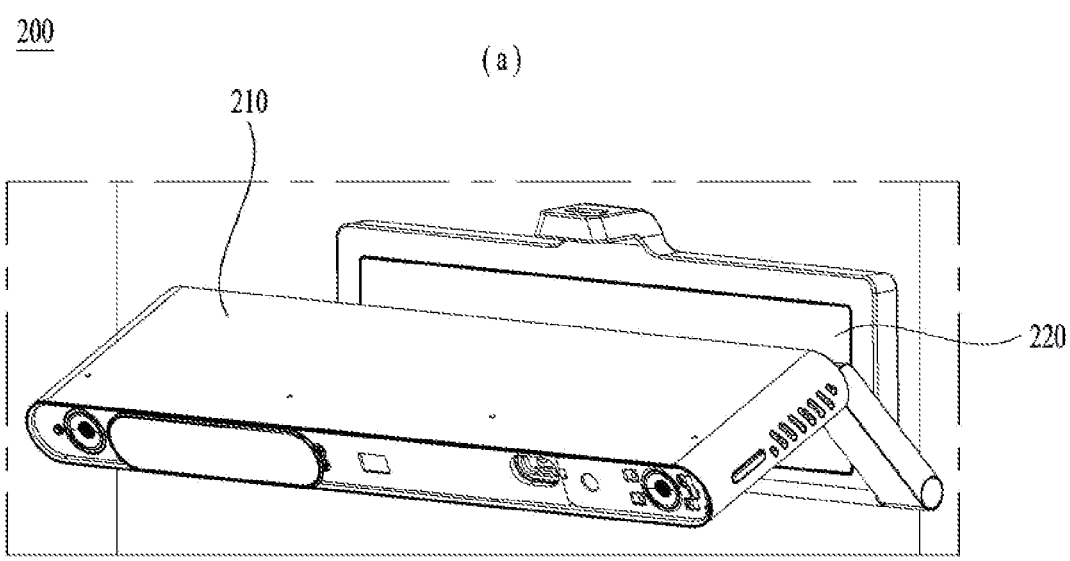

FIG. 2 is a diagram showing an installation example of a video camera 200 of the present disclosure. The video camera 200 of the present invention includes a housing 211a and 211b of a body 210 in which electronic components such as cameras 235a and 235b and the like are installed and a stand 220 configured to fixing the video camera 200 to a mounting surface.

In addition to the method of mounting on the floor as shown in FIG. 1, the stand of the present disclosure invention may be fixed to a top side of a display device 100 or a wall surface as shown in FIG. 2.

As shown in FIG. 2(a), the stand may be fixed to a top side of a display unit. The stand may be stably fixed to a top side of a display device 100, of which bezel becomes narrower and thinner recently. In addition, as shown in FIG. 2(b), the stand may also be fixed to a wall surface.

Figure 3:
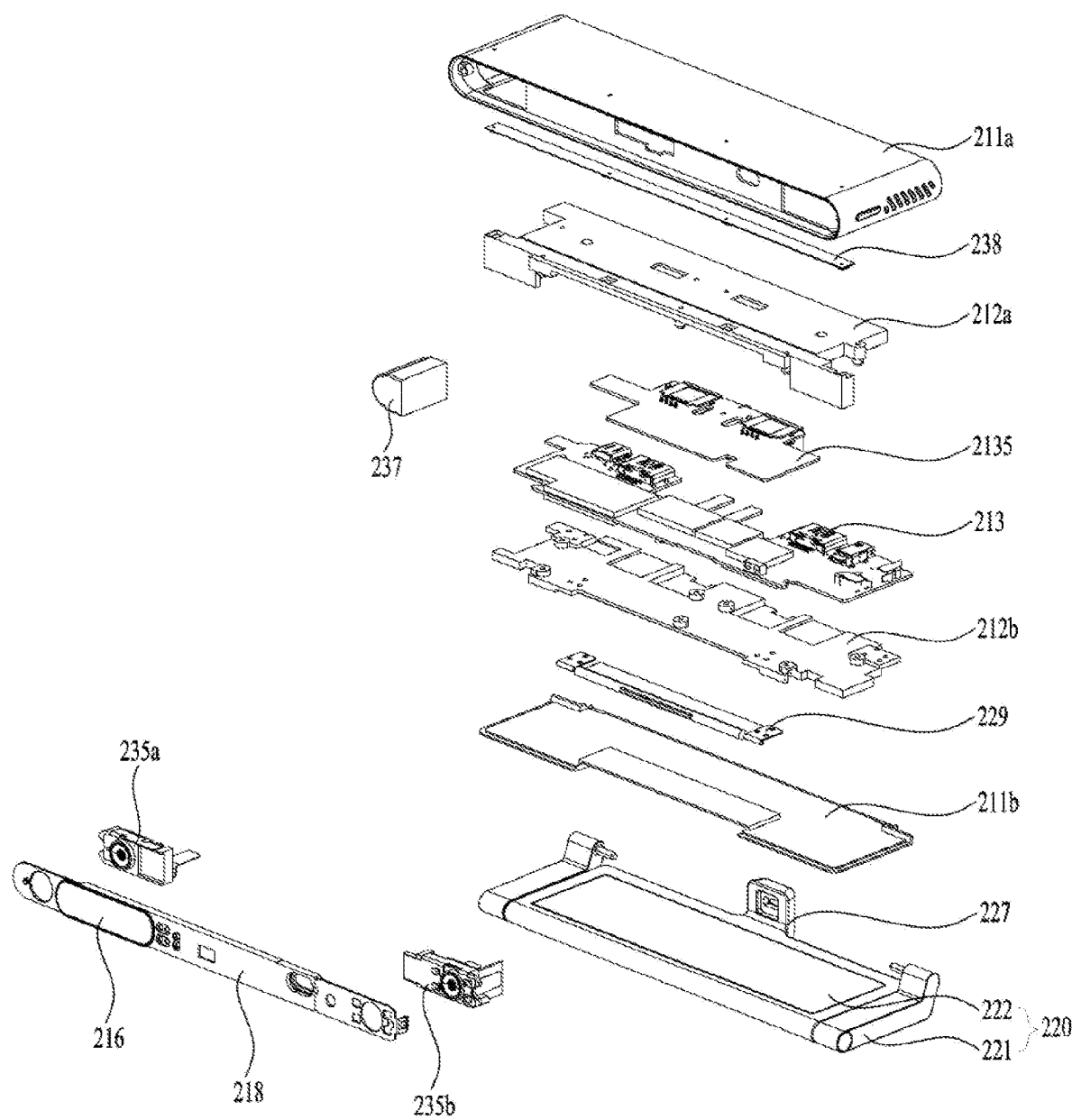
FIG. 3 is an exploded perspective diagram of a video camera according to the present disclosure.

FIG. 3 is an exploded perspective diagram of a video camera 200 according to the present disclosure. The video camera 200 of the present disclosure includes a housing 211a and 211b of a body 210 in which cameras 235a and 235b and a board unit 213 are located, and is provided with a stand 220 coupled to the housing 211a and 211b of the body 210.

As the housing 211a and 211b of the body 210 is implemented in a rectangular box shape, it is advantageous in minimizing a volume and facilitating portability. In addition, as shown in FIG. 2(a), when the housing 211a and 211b of the body 210 mounted on a top side of the display device 100, since the housing 211a and 211b of the body 210 has a shape long in a horizontal direction, it is not projected from the top side of the display device 100. Namely, although the housing 211a and 211b of the body 210 is installed on the top side of the display device 100, it is able to minimize the influence on an exterior of the display device 100.

As the housing 211a and 211b of the body 210 is disposed long in a horizontal direction, a front side has a wide area, various types of cameras such as a wide angle camera 235a, an IR camera 235b and the like may be installed. When more various types of the cameras 235a and 235b are provided, a sensing range becomes wider.

For example, the wide angle camera 235a may capture a wide area without a blind spot, and the IR camera 235b may recognize an object even at dark night. In addition, since it is possible to detect the distance, it is possible to obtain distance information necessary for controlling IOT devices.

In addition to the cameras 235a and 235b, electronic components such as an illumination sensor, a temperature sensor, a proximity sensor, a microphone 218, a speaker 217 and the like may be mounted together to expand functions.

Since the housing 211a and 211b of the body 210 forms an external appearance, the housing 211a and 211b may be formed by injection molding and my further include a metal frame 212 for mounting electronic components such as the board unit 213, the cameras 235a and 235b and the like with internal rigidity. A window covering the cameras 235a and 235b and sensors located on the front side may be included. A camera cover 216 capable of physically covering a camera may be included to protect personal privacy. The camera cover 216 may slide to move and selectively open and close the camera 235a. The camera cover 216 of the present disclosure is disposed only on a side of the wide-angle camera 235a, but may also be installed on a side of the IR camera 235b. A stand 220 is fastened to the body 210 and, more specifically, may be coupled to a rigid frame 212 to support a force. The stand 220 of the present disclosure may be folded to be in a manner of getting close contact with a bottom side of the body housing 211b as shown in FIG. 1(a), and an angle thereof may be changed as shown in FIG. 1(b) to adjust a position with respect to a bottom surface of the body 210.

As shown in FIG. 1(a), the stand 220 of the video camera 200 according to the present disclosure may be folded so that the stand 220 is in close contact with the body housing 211b, thereby being portable and facilitating height adjustment advantageously.

Figure 4:
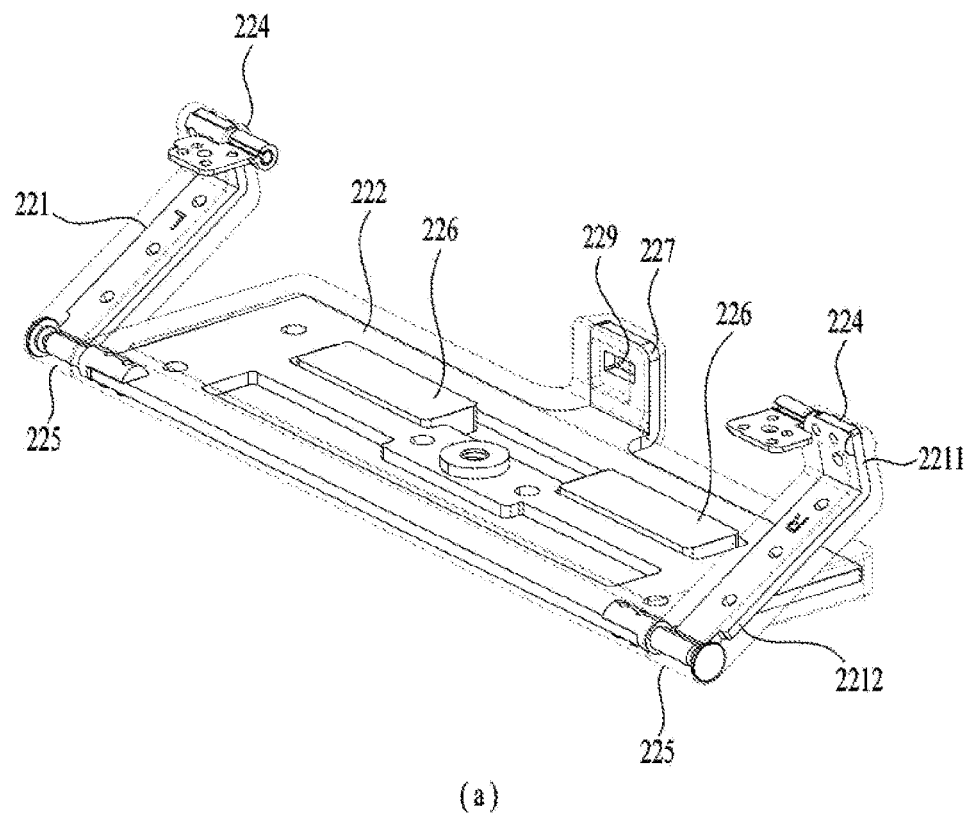
FIG. 4 is a perspective diagram showing a stand of a video camera according to the present disclosure.
Figure 4:
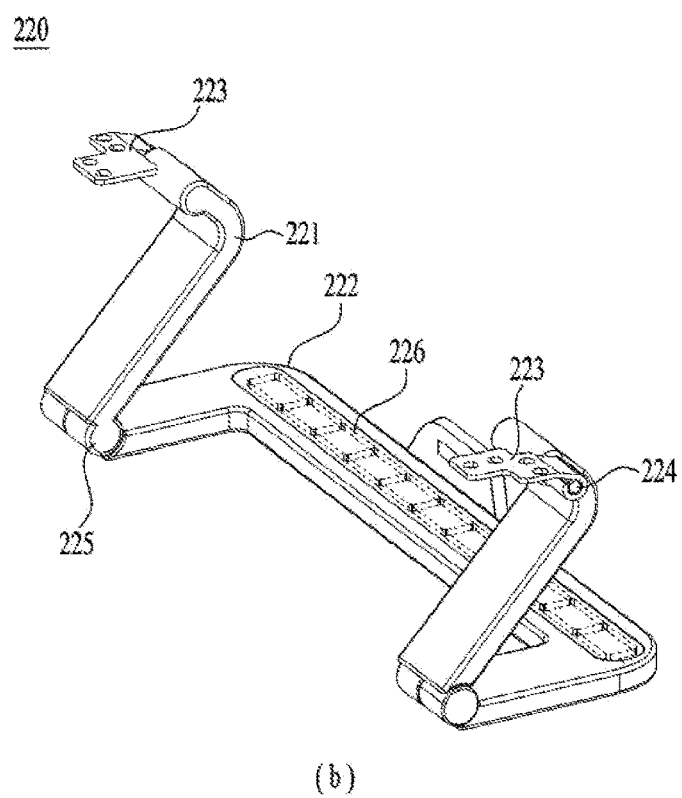

FIG. 4 is a perspective diagram showing a stand 220 of a video camera 200 according to the present disclosure.

The stand 220 of the present disclosure may include a leg bracket 223 coupled to the body 210, a first leg 221 rotatably coupled to the leg bracket via a first hinge 224, and a second leg 222 rotatably coupled to the first leg 221 via a second hinge 225.

The stand 220 may include a single leg bracket 223, a first leg 221, a second leg 222, a first hinge 224 and a second hinge 225. Alternatively, as shown in FIG. 4, the stand 220 may include a pair of leg brackets 223, a pair of first legs 221, a pair of first hinges 224 and a pair of second hinges 225m, and a second leg 222 is connected in-between to be integrally configured.

If only one leg is provided, it may be inclined to one side, hence degrading stability. If the leg is configured in a wide shape in a side direction for stability, an area of a leg may be widened unnecessarily.

When the stands 220 are provided at both sides thereof, respectively, each leg should be adjusted. When the shapes of the stands 220 at both sides thereof are different from each other, the body 210 may be inclined in a lateral direction. Thus, a pair of the first legs 221 may be coupled to both sides of the body 210, thereby providing stability.

The second leg 222 is located between the first legs 221, and may be connected to a pair of the first legs 221 via the second hinges 225. The second leg 222 may be configured in a plate shape having a large area to provide a sense of stability as a portion in contact with the mounting surface. Alternatively, as shown in FIG. 4(b), the second leg 220 may have a U-shape of which front side is omitted.

The second leg 222 forms the mounting surface, and the first leg 221 plays a role in adjusting a height angle between the second leg 222 and the body 210.

The first leg 221 and the second leg 222 may be configured to have the same thickness, and when the second hinge 555 between the first leg 221 and the second leg 222 is folded to become 0°, the first leg 221 and the second leg 222 may overlap or form the same plane.

As shown in FIG. 3, when the second leg is disposed between the first legs, the thickness of the stand may be minimized when the stand is folded.

As shown in FIG. 1(a), the first leg 221 and the second leg 222 may be disposed in parallel with a bottom surface of the housing 211a and 211b of the body 210 in a state in which both of the first hinge and the second hinge are folded to form 0°.

The second leg 222 of the present disclosure may include a magnet 226, as shown in FIG. 4. Recently, as the thickness of the display device 100 decreases, a case may uses a galvanized steel plate for rigidity or an inner member made of a metal material may be provided in the case, and thus the second leg 222 may be attached to the display device 100 through a magnetic force of the magnet 226.

The stand 220 of the video camera 200 of the present disclosure may adjust an angle between the body 210 and the first leg 221 and an angle between the first leg 221 and the second leg 222 through the first hinge 224 and the second hinge 225, thereby changing the shape of the stand 220 in various forms.

The first leg 221 may have a bent shape. That is, an upper leg to which the first hinge 224 is coupled and a lower leg to which the second hinge 225 is coupled may have a bent shape. Since the first hinge 224 coupled to the leg bracket 223 is located in a backside direction of the body 210 in order to increase the fastening force by horizontally coupling the leg bracket 223 to the frame 212, a first end portion of the first leg 221 is located over a bottom side of the body 210.

As shown in FIG. 1(a), the first leg 221 may be configured to implement a length, which corresponds to a height difference between the first end portion to which the leg bracket 223 is coupled and the bottom surface of the housing 211a and 211b of the body 210, with the upper leg 2211 and have the upper leg 2211 bent with the lower leg 2212. The upper leg 2211 and the lower leg 2212 may be bent with each other while forming a curve.

Figure 5:
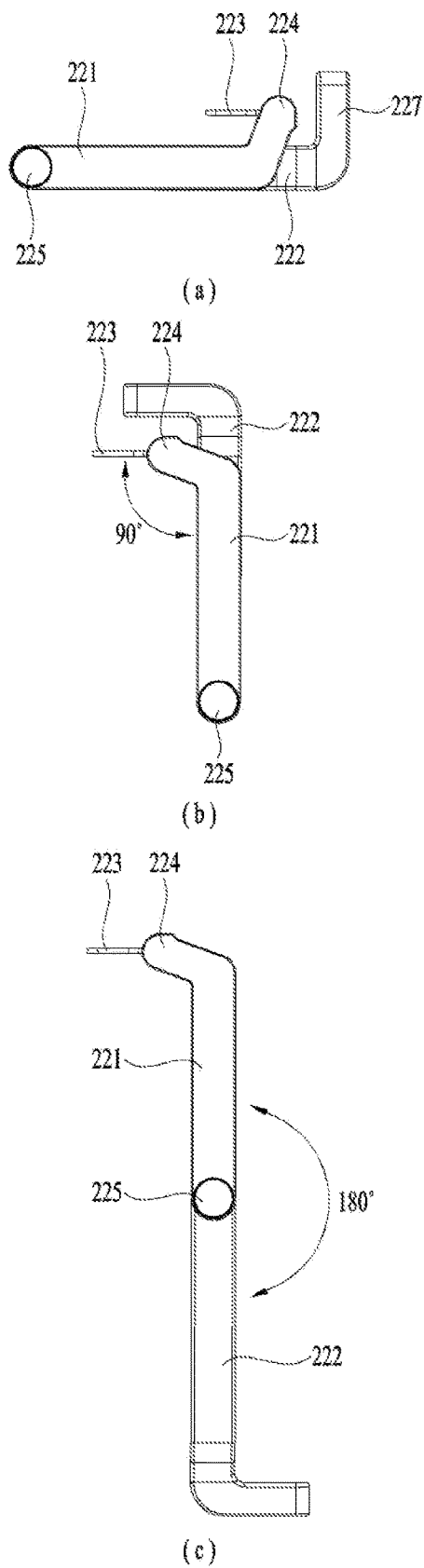
FIG. 5 is a diagram showing a hinge rotation range of a stand of a video camera according to the present disclosure.

FIG. 5 is a diagram showing a range of a rotatable angle between the first hinge 224 and the second hinge 225. The first hinge 224 and the second hinge 225 may be disposed in parallel with each other, the first hinge 224 may rotate within a range of 90° as shown in FIG. 5(a) and FIG. 5(b), and the second hinge 225 may rotate within an angle range of 180° as shown in FIG. 5(b) and FIG. 5(c).

Since each of the first hinge 224 and the second hinge 225 has friction, an angle thereof is changed when a force of a predetermined size or more is applied. Since the weight of the body 210 is only a few hundred grams, the angle is not changed by the weight of the body 210.

Figure 6:
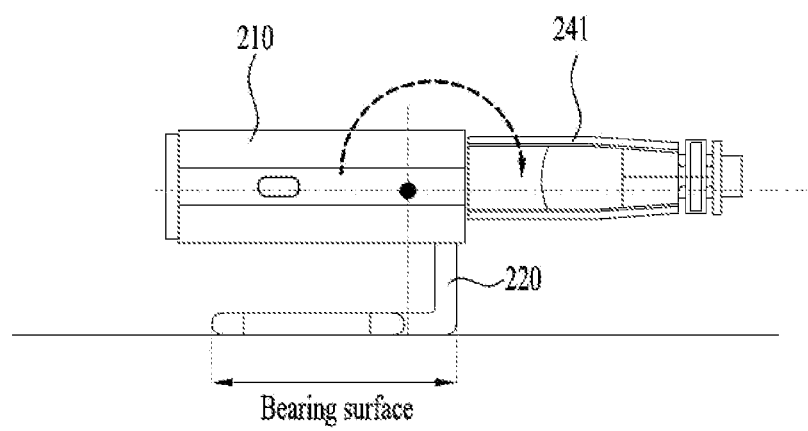
FIG. 6 is a diagram showing an example of a stand of a video camera of a related art.
Figure 6:
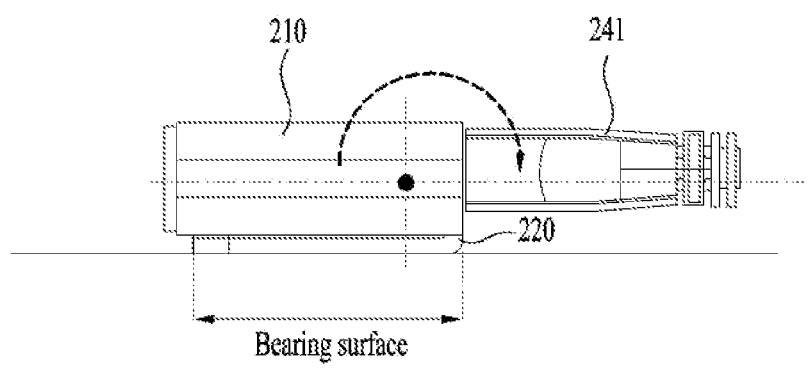

FIG. 6 is a diagram showing an example of a stand 220 of a video camera 200 of a related art. Since a plug 241 of a USB, a HDMI cable or a power cable is connected to a backside of the video camera 200, the center of gravity of the video camera 200 may be located slightly in a backside direction from the center of a body 210.

When the center of gravity of a bearing part is located at the center of a bearing surface of the stand 220, stable mounting is possible. However, when the stand 220 has a length corresponding to a front-rear direction length of the body 210, as shown in FIG. 6(a), the center of gravity is biased in a backside direction, and thus a front side of the video camera 200 is easily inclined upward. As shown in FIG. 6(b), when the body 210 is in close contact with the stand 220, stable mounting is possible, but it is difficult to adjust the height and angle of the body 210.

Figure 7:
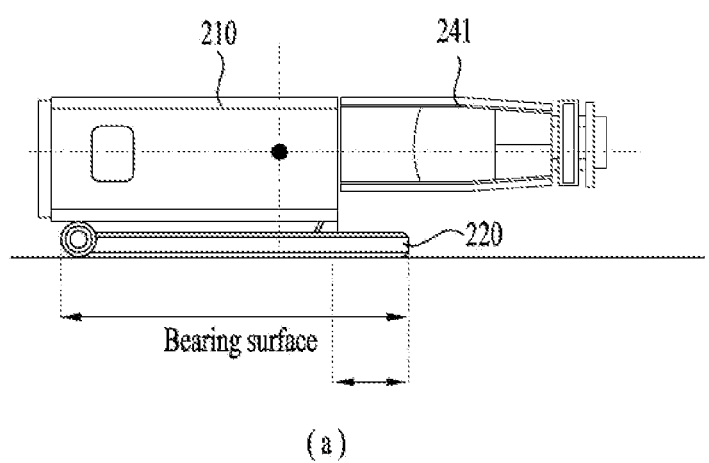
FIG. 7 is a diagram showing a form of mounting a video camera of the present disclosure on a floor.
Figure 7:
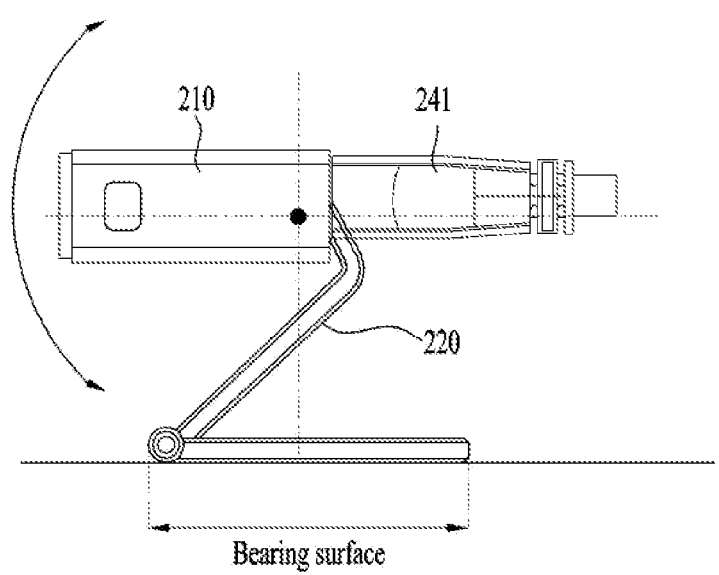

FIG. 7 is a diagram showing a form of mounting a video camera 200 of the present disclosure on a floor. A stand 220 of the video camera 200 of the present disclosure is configured to extend partially in a backside direction of the body 210 so as to reinforce the bearing force in a backside direction of the center of gravity.

As shown in FIG. 7(a), the body 210 can be stably mounted while being in close contact with a floor surface. As shown in FIG. 7(b), the height of the body 210 may be increased by adjusting angles of the first hinge 224 and the second hinge 225. In this case, since a position of the body 210 with respect to the second leg 222 (a bearing surface) moves in a front direction, even when the body 210 is spaced apart from the bearing surface, the center of gravity moves in a central direction of the bearing surface, whereby the body 210 may be stably mounted.

Since the angle of the body 210 can be freely adjusted by adjusting the angle of the first hinge 224, the cameras 235a and 235b may be disposed in a desired direction even when the mounting surface is positioned on a floor side or above.

Figure 8:
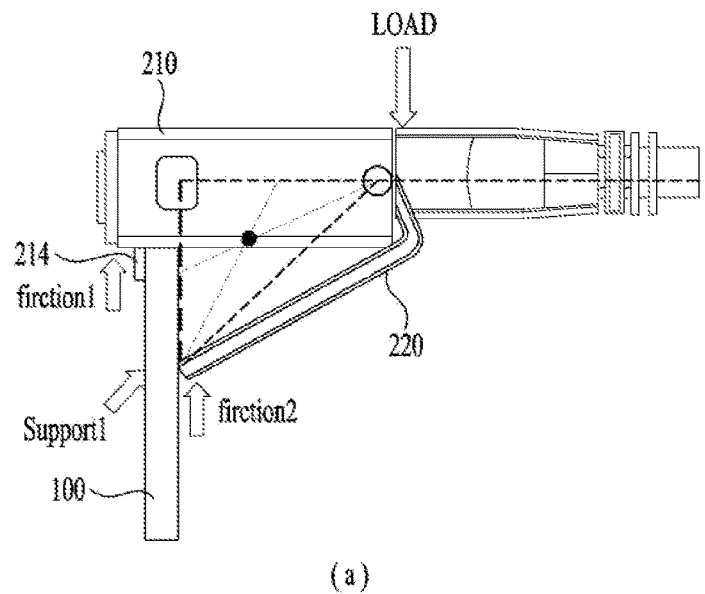
FIG. 8 is a diagram showing a state in which a video camera of the present disclosure is mounted on a display device depending on a presence or absence of a second leg.
Figure 8:
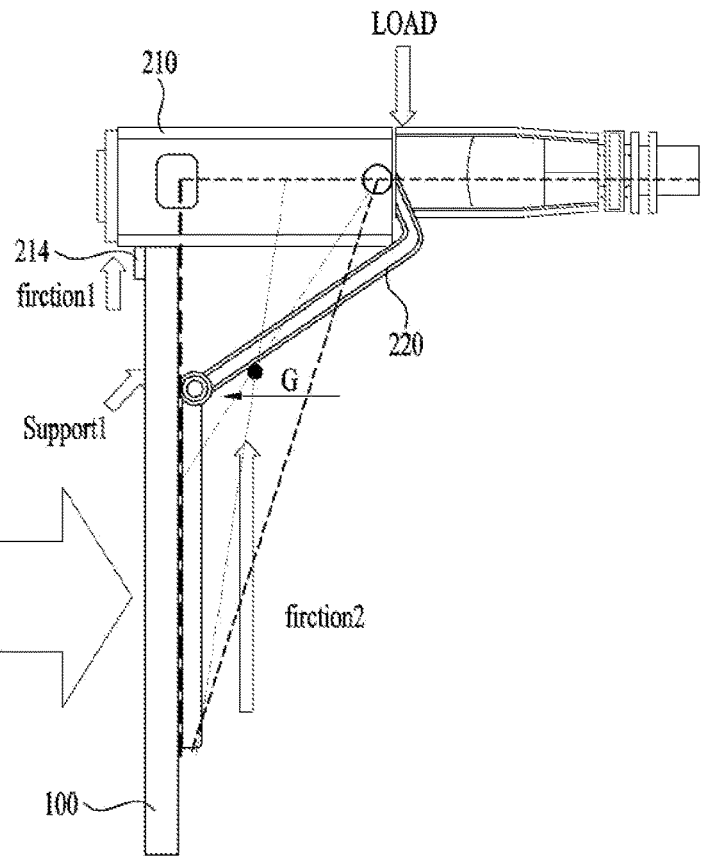

FIG. 8 is a diagram showing a state in which the video camera 200 of the present disclosure is mounted on the display device 100 depending on a presence or absence of the second leg 222.

FIG. 8(a) shows s a video camera having no second leg 222 according to a related art, and FIG. 8(b) shows an embodiment of the video camera 200 having the second leg 222 according to the present disclosure.

Although a clip shape is conventionally used to be applied to the display device 100 according to various thicknesses and backside shapes, a top bezel of a predetermined size or more is required in the display device in order to stably fix a clip-shaped stand.

Recently, as there are products in which the bezel size of the display device 100 is small and less than 1 cm, a stand applicable to a thick display device 100 as well as to a product with a small bezel is required.

A front leg 214 positioned on a front bottom side of the body 210 may be included so as to contact a front top side of the display device 100. The video camera 200 located above the display device 100 may weigh in a backside direction, and the front leg 214 may be in close contact with the front top side of the display by the weight of the video camera 200.

The front leg 214 may be disposed at a position that does not overlap the stand 220 in a folded state so that the stand 220 may be in close contact with the body 210 while it is in the folded state.

As shown in FIG. 8(a), the first leg 221 may contact a backside of the display device 100 to support the weight of the body 210. However, in the shape of the stand 220 without the second leg 222, since only an end portion of the first leg 221 of the stand 220 contacts the display device 100, an area in which the stand 220 contacts the display device 100 is small, and thus a bearing force is weak.

Accordingly, according to an embodiment of the present disclosure including the second leg 222 as shown in FIG. 8(b), a contact area between the stand 220 and the display device 100 increases, thereby increasing a frictional force and a reaction force by the second leg 222.

Since the display device 100 includes a metal material in a backside case or at least an inside thereof, the stand 220 may be fixed to the display apparatus 100 through a magnetic force of the magnet 226 positioned in the second leg 222.

Figure 9:
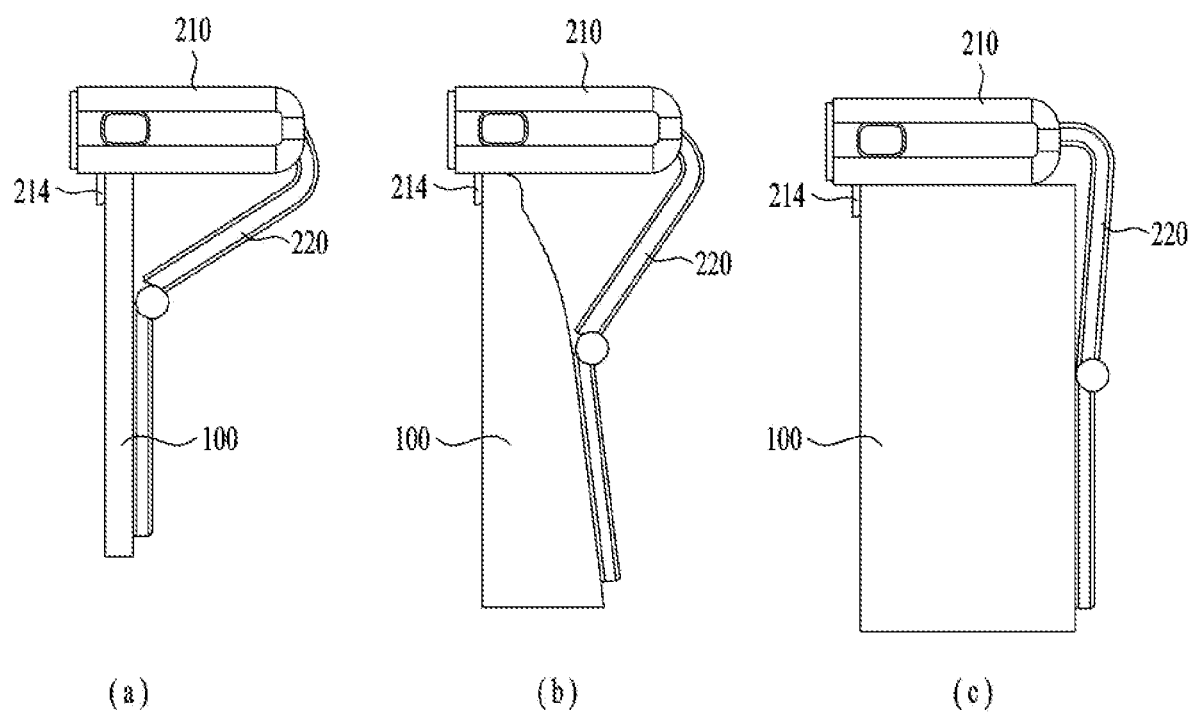
FIG. 9 is a diagram showing aspects in which a video camera of the present disclosure is mounted on each of display devices in various shapes.

FIG. 9 is a diagram showing aspects in which the video camera 200 of the present disclosure is mounted on each of the display devices 100 in various shapes. FIG. 9(a) is a diagram showing that the video camera 200 of the present invention is mounted on a thin display device 100, FIG. 9(b) is a diagram showing that the video camera 200 of the present invention is mounted on a display device 100 having an inclined surface on a backside thereof, and FIG. 9(c) is a diagram showing that the video camera 200 of the present invention is mounted on a thick display device 100.

The angles of the first leg 221 and the second leg 222 may be adjusted by using the first hinge 224 and the second hinge 225 to correspond to the thickness and backside shape of the display device 100 to have the video camera 200 mounted thereon.

The second leg 222 comes in close contact with the backside of the display device 100, and the angles of the first hinge 224 and the second hinge 225 may be changed so that the first leg 221 can connect the body 210 and the second leg 222 irrespective of the thickness and backside shape of the display device 100.

As shown in FIG. 8, the second leg 222 may be fixed to the backside of the display device 100 through the friction force of the second leg 222 and the magnetic force of the magnet 226 installed in the second leg 222, and the first leg 221 may support the body 210 to enable the video camera 200 to be fixed to the top side of the display device 100 as shown in FIG. 9.

Figure 10:
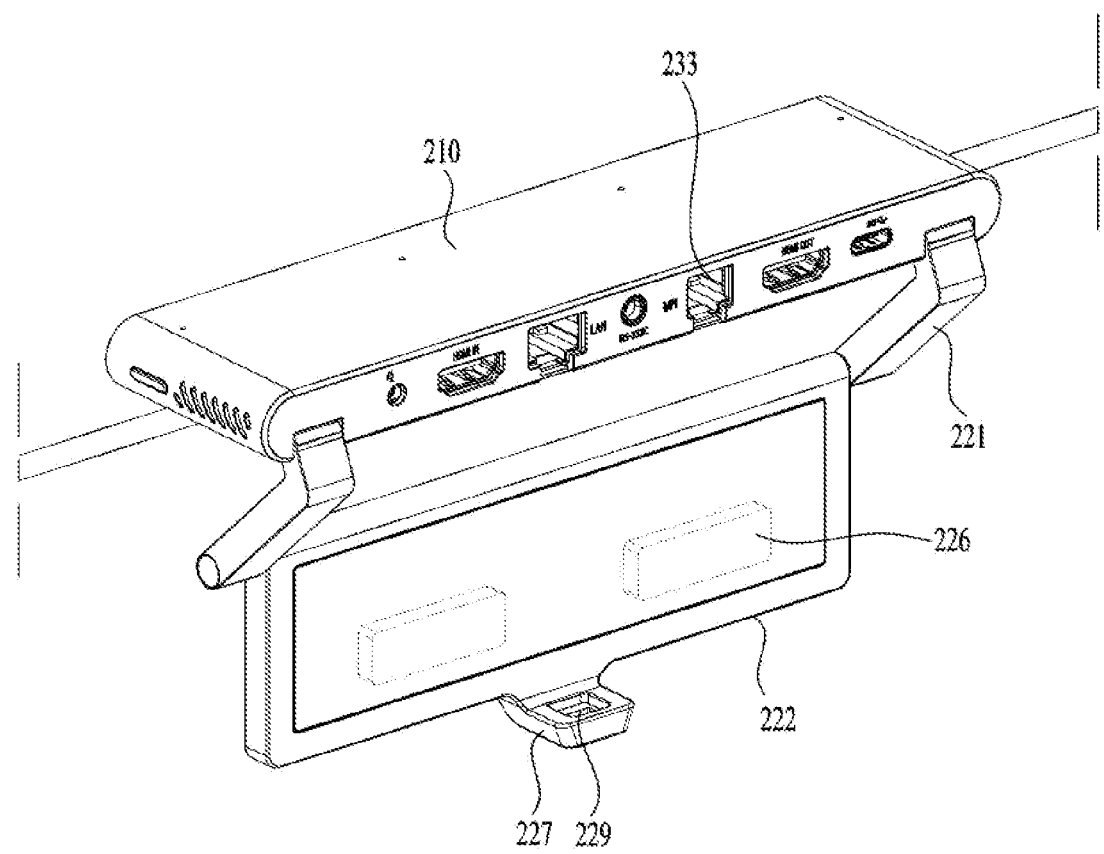
FIG. 10 is a rear view diagram showing a state in which a video camera of the present disclosure is mounted on a display device.

FIG. 10 is a rear view diagram showing a state in which the video camera 200 of the present disclosure is mounted on the display device 100. A power terminal or a cable terminal connected to an external device may be disposed on the backside of the body, and the cable terminal may be positioned between a pair of the first legs 221.

A security hole 229 located in the stand 220 of the video camera 200 may be further included.

The security hole 229 is a device in which a locking device such as a Kensington locker can be inserted. The video camera 200 may be installed in a public place, and in this case, there is a risk of theft.

The theft of the video camera 200 may be prevented through the security hole 229 into which a lock device inserted into the hole and then expanded to be fixed therein, such as a Kensington locker, can be inserted.

The position of the security hole 229 is not limited, but when the security hole 229 is formed in a rear side of the body 210, the center of gravity of the body 210 may be further biased in a backside direction, and when the security hole 229 is formed in the first leg 221 on one side, the left and right balance of the center of gravity may collapse.

When the security hole 229 is formed in the second leg 222, as the second leg 222 is configured to be in close contact with the bearing surface, and thus it is difficult to fasten the lock device in a mounted state.

Therefore, as shown in FIG. 10, the security hole 229 may be formed in a protrusion 227 protruding from an end portion of the second leg 222, and the second leg 222 may extend more in a backside direction than the body 210 so that the protrusion 227 fails to overlap the first leg 221 in a folded state of the stand 220.

Figure 11:
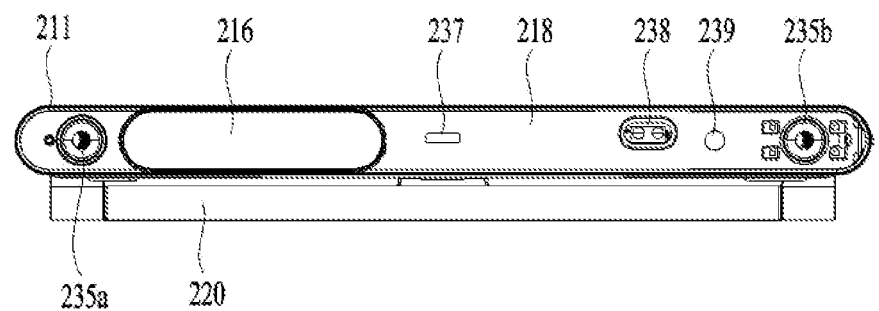
FIG. 11 is a diagram illustrating front and rear sides of a video camera according to the present disclosure.
Figure 11:
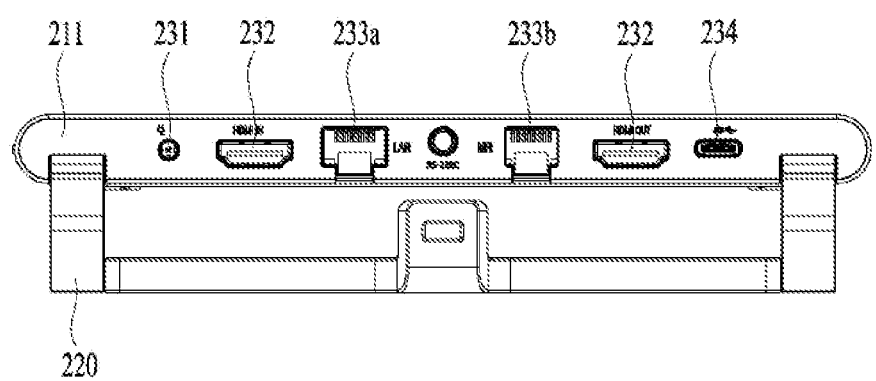

FIG. 11 is a diagram illustrating front and rear sides of the video camera 200 according to the present disclosure. FIG. 11(a) shows a front side of the video camera 200, and FIG. 11(b) shows a rear side thereof.

A sensor unit for photographing an image or detecting a thing or environment in front is disposed on a front side of the video camera 200. A plurality of socket holes 231, 232, 233a and 233b in which plugs for connections to a power source and external devices are inserted are formed in a rear side of the video camera 200.

Referring to FIG. 11(a), a plurality of camera modules 235a and 235b located on the front side may be included. By leaving the camera modules 235a and 235b at horizontally different positions, a distance to a thing can be calculated.

A plurality of the camera modules 235a and 235b may include the camera modules 235a and 235b with different functions for obtaining various informations. A wide-angle camera 235a is unnecessary for video conferencing with one person located in front, but the wide-angle camera 235a capable of detecting a wider range is more useful for non-face-to-face treatment and use in hospital rooms.

It may include a Night Vison (NV) camera 235b capable of photographing in low-light environments to detect a forward situation even in a dark situation with lights off. The two cameras 235a and 235b may be disposed in a manner of being spaced apart from each other.

A status display lamp 237 displaying a color to indicate a status of the video camera 200 may be included, and an IR remote light receiving unit 238 for receiving a signal from a wireless remote controller may be included. Sensors such as an illuminance sensor 239 and a proximity sensor may be included, and sensors capable of measuring heart rates, body temperature and the like may be further included to specialize in telemedicine.

The socket holes 231, 232, 233a and 233b located in the rear side may include a DC terminal 231 for power source connection, and further include an HDMI socket 232, a USB C socket 234 and the like connected to data cables for transmitting image information obtained from the camera module 235 to other devices.

It may be connected to a base station by connecting to another terminal in a wireless communication method, but communication sockets 233a 233b may be included to directly connect to a communication cable 240 without using another terminal.

Since a data cable uses a plug in a shape different according to a standard, a plurality of data sockets 232 and 234 may be provided. The communication cable may also use a plug having a different shape or size, as shown in FIG. 11(b), a plurality of communication sockets 233a 233b may be included. The communication sockets 233a 233b will be described in more detail with reference to FIGS. 16 to 18.

Figure 12:
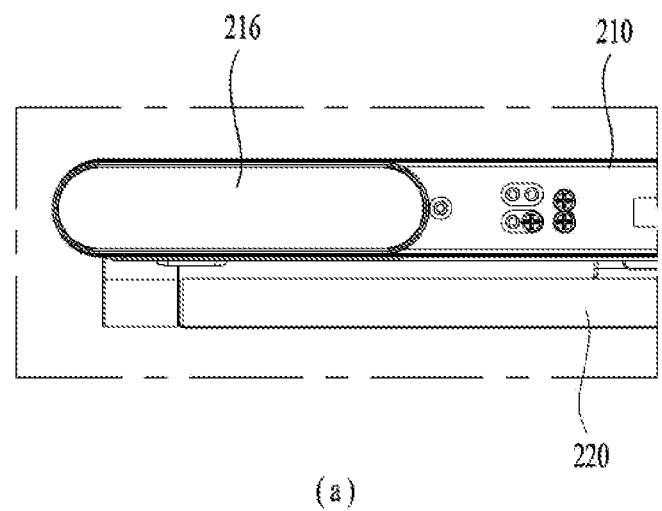
FIG. 12 is a diagram illustrating a camera cover of a video camera according to the present disclosure.
Figure 12:
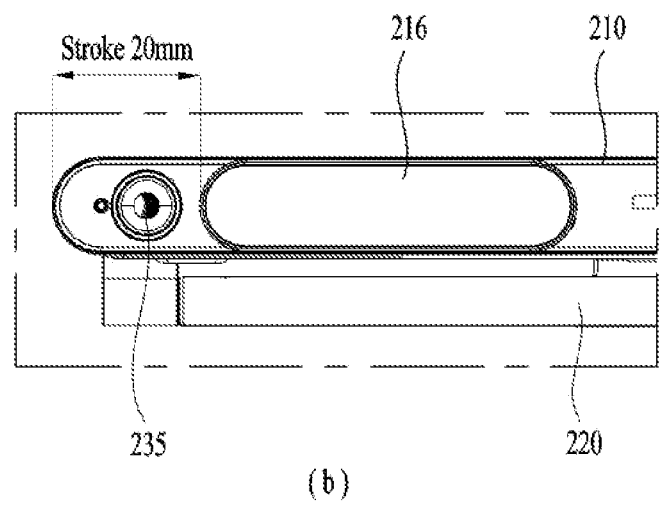

FIG. 12 is a diagram illustrating a camera cover 216 of the video camera 200 according to the present disclosure. As shown in FIG. 12(a), the camera cover 216 may cover the camera module 235. As shown in FIG. 12(b), the camera cover 216 may expose the camera module 235.

Since the camera module 235 of the installed video camera 200 is capable of 24-hour photographing, the camera cover 216 that physically covers the camera module 235 may be required for privacy.

A video camera of the related art such as a CCTV uses a method of attaching an adhesive memo paper and the like or changing a location of the video camera body 210 in consideration of privacy. The video camera 200 of the present disclosure may solve the privacy problem in a manner of having the camera cover 216 that physically covers the camera module 235.

In order to cover the camera module 235 selectively, the camera cover 216 may move using a sliding structure or a hinge structure. As the video camera 200 of the present disclosure has a box shape wider in a horizontal direction, the camera cover 216 may have a configuration slidably movable in the horizontal direction.

Although the camera cover 216 is installable for the night vision camera 235b, the present embodiment shows that the camera cover 216 is located only on a front side of the wide-angle camera 235a that photographs a color image.

The camera cover 216 may be coupled to a front case 218 of the body to be slidably movable in direct, or implement a slide structure by having a rail or slit provided to the front case 218.

Regarding a slide rail, a pair of rails may be disposed to top and bottom sides of the camera cover 216. Yet, if the slide rail is exposed to a front view, it may ruin a front design. According to the present embodiment, a slide slit 2184 is formed in the front case 218 and the camera cover 216 is fitted into the slide slit 2184 so as to slidably move in the horizontal direction.

Figure 13:
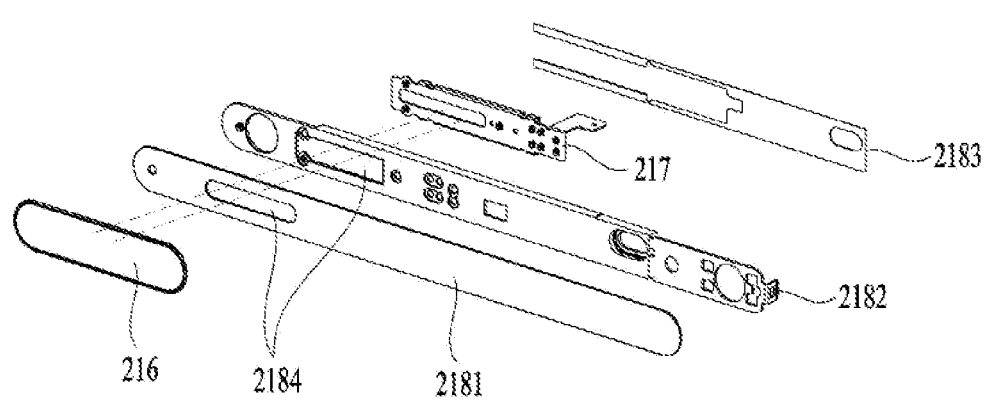
FIG. 13 is an exploded perspective diagram of a front structure of a video camera according to the present disclosure.

FIG. 13 is an exploded perspective diagram showing the front case 218 and the camera cover 216 of the video camera 200 according to the present disclosure. The front case 2181 and 2182 attached to the front side of the body housing 211 shown in FIG. 3 may be coupled to the body housing 211 using a tape 2183.

The front case 2181 and 2182 may further include a front frame 2182 having an opening formed therein to expose the camera module 235, sensors, etc. and a front glass 2181 coupled to the front side of the front frame 2182 to protect the camera module 235 and the like.

A slide slit 2184 configured to guide a slide movement of the camera cover 216 is formed in each of the front glass 2181 and the front frame 2182, and the camera cover 216 may be coupled to a cover slider 217 through the slide slit 2184.

The cover slider 217 is located inside the front frame 2182 and connected to the camera cover 216, thereby fixing the camera cover 216 to the body and assisting the horizontal movement.

When a movement of the camera cover 216 in a horizontal direction is free, the camera cover 216 may be unintentionally open or closed while moving in the horizontal direction. Therefore, the camera cover 216 should be fixed so as not to move unless receiving a force over a predetermined size in a closed or open status. For the fixing force of the camera cover 216, the cover slider 217 may include an elastic part 2175.

Figure 14:
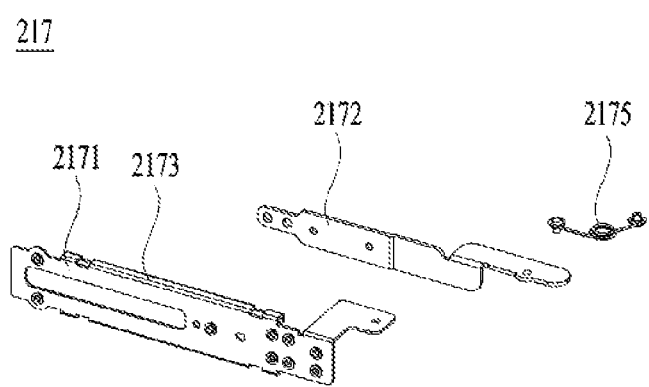
FIG. 14 is an exploded diagram of a cover slider of a video camera according to the present disclosure.

FIG. 14 is an exploded diagram of the cover slider 217 of the video camera 200 according to the present disclosure. The cover slider 217 may include a fixed frame 2171 fixed to the body housing 211, a slide rail 2173 provided to the fixed frame 2171, and a slide frame 2172 fitted into the slide rail 2173 to move along the slide rail 2173, and further include an elastic part 2175 connecting the slide frame 2172 and the fixed frame 2171 together.

The elastic part 2175 connects the slide frame 2172 and the fixed frame 2171, applies elasticity to enable the slide frame 2172 to be fixed in a closed or open state, and is compressed when a user pushes the camera cover 216.

The elastic part 2175 provides an effect of automatically opening or closing the camera cover 216 when the user pushes the camera cover 216 at a predetermined distance, and fixes the camera cover 216 so that it does not move unless a force of a predetermined size or more is applied in an open or closed state.

Figure 15:
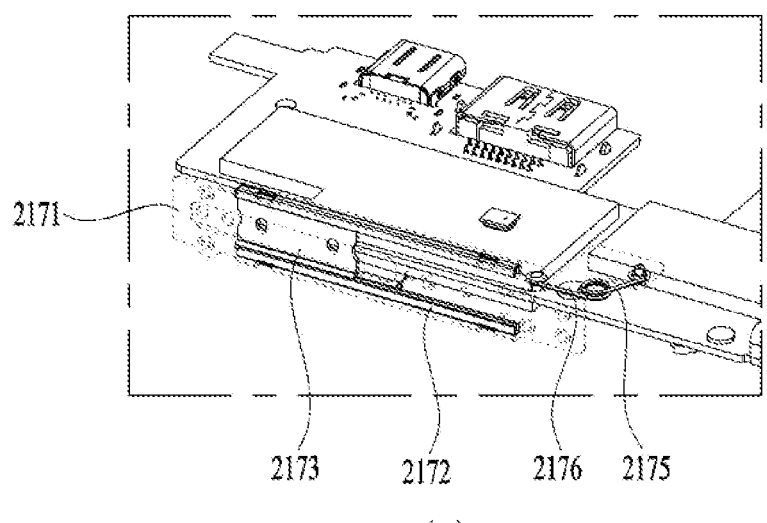
FIG. 15 is a diagram illustrating an operation of a cover slider of a video camera according to the present disclosure.
Figure 15:
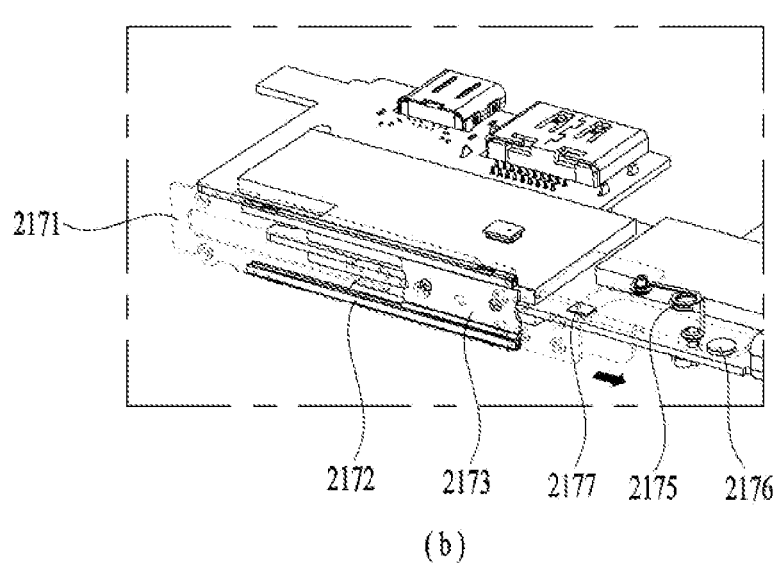

FIG. 15 is a diagram illustrating an operation of a cover slide of a video camera according to the present disclosure. The elastic part 2175 of the present disclosure may use a torsion spring, and may have one end located at the slide frame 2172 and the other hand at the fixed frame 2171.

When the camera cover 216 is pushed in a right direction in the closed state, as shown in FIG. 15(a), the angle of the torsion spring 2175 decreases. In doing so, when the camera cover 216 crosses a middle point, the direction of the elasticity in a direction of spreading the torsion spring 2175 becomes the same as the direction of the slide force, the camera cover 216 is quickly switched to the open state as shown in FIG. 15(b).

In the opposite case, the torsion spring 2175 is compressed and stretched in the same order, and the camera cover 216 may slidably move semi-automatically.

A sensor that detects a position of the camera cover 216 is needed to stop the operation of the camera module 235 based on covering the camera module 235 by the camera cover 216 and activate the camera module 235 based on opening the camera cover 216.

An illuminance sensor that detects whether the camera cover 216 is opened or closed may be disposed on a front side, but it is difficult to distinguish between the case of closing the camera cover 216 and the case of night. Besides, if an additional illuminance sensor is provided to the front side, the cost may increase.

The present disclosure may detect whether the camera cover 216 is opened or closed by detecting a movement of the slide frame 2172 using an inexpensive hall sensor 2177.

A magnet 2176 is provided in the slide frame 2172 and the hall sensor 2177 is formed on a board. Hence if the magnet 2176 is positioned on the hall sensor 2177, it may be determined as a closed state (or an open state). If the magnet 2176 is spaced apart from the hall sensor 2177, it may be determined as the open state (or the closed state).

As shown in FIG. 15, the hall sensor 2177 is directly disposed on the board so that a separate wiring is not required. The controller may turn on/off the camera module 235 based on the detection result of the hall sensor 2177, and the camera cover 216 may also function as a switch.

Figure 16:
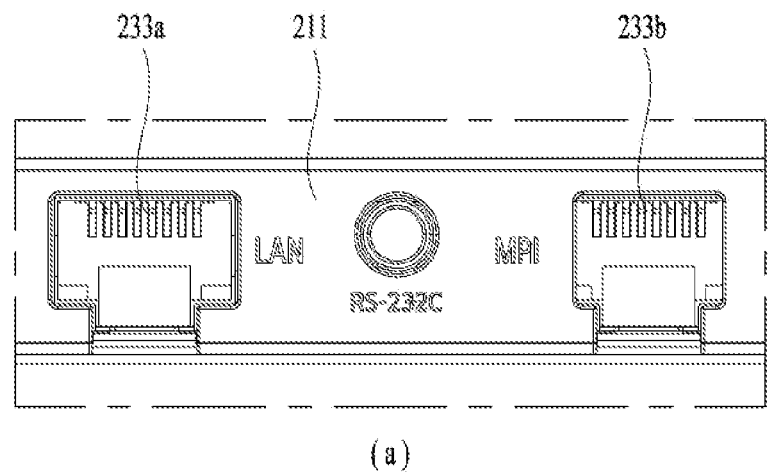
FIG. 16 is a diagram illustrating a communication socket of a video camera according to the present disclosure.
Figure 16:
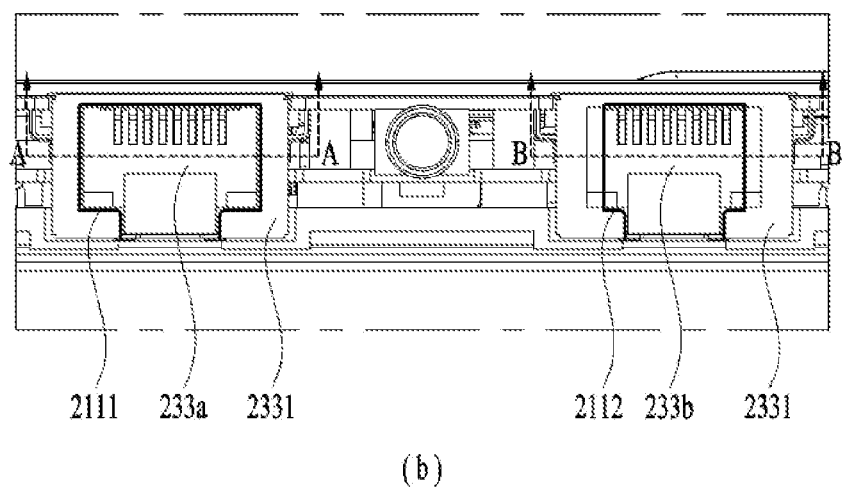

FIG. 16 is a diagram illustrating the communication sockets 233a and 233b of the video camera 200 according to the present disclosure. As described in FIG. 11, sockets of various specifications are disposed on the rear side of the body, and the communication sockets 233a and 233b may be provided to perform communication without a separate terminal.

Since the communication sockets 233a and 233b are unnecessary for the types connected to a terminal by wireless communication, as shown in FIG. 3, only the communication sockets 233a and 233b are mounted on a separate board to be added or omitted depending on a model.

The communication sockets 233a and 233b are characterized in being connected to an external network in a manner of inserting a plug connected to a telephone network cable 240 or the like. RJ12 241b used for phone connection is commercialized, and RJ45 241a is used as a plug for data communication.

The RJ12 241B is a 6P6C type consisting of six pins and six cables 240, and the RJ45 241a is used on the Internet, so it may configured with eight pins to transmit a lot of data.

The width of the plug for the RJ45 having a large number of pins is greater than the width of the plug for the RJ12, and thus the sizes of socket holes 2111 and 2112 formed in the rear side of the body housing 211 are different as shown in FIG. 16(a).

However, when each of the RJ45 communication socket module and the RJ12 communication socket module are used, there is a problem that the number of parts increases and the assembly time increases. Accordingly, it is possible to implement the communication socket 233a for an RJ45 plug and a communication socket 233*b* for an RJ12 plug by adjusting the sizes of the socket holes 2111 and 2112 despite using the communication socket module 2331 that matches the number of pins of the RJ45 plug.

The RJ45 plug and the RJ12 plug have the same height but the fastening structure, but differ in the number of the pins and the width only. Using these features, the communication sockets 233*a* and 233*b* for different types of the plugs 241*a* and 241*b* can be implemented with the same RJ45 communication socket module 2331 by varying the width of the socket holes 2111 and 2112 and enabling/disabling some pins in software.

The description is based on an RJ12 communication socket with 6 pins and an RJ45 communication socket with 8 pins, but is not limited thereto. A communication socket with a large number of pins will be referred to as a first communication socket 233*a* and a communication socket with a small number of pins will be referred to as a second communication socket 233*b*.

Described below is a method of implementing the second communication socket 233*b* using a communication socket module (i.e., a component 2331 having a number of pins corresponding to the number of pins of the first communication socket 233*a*) used for the first communication socket 233*a*.

Figure 17:
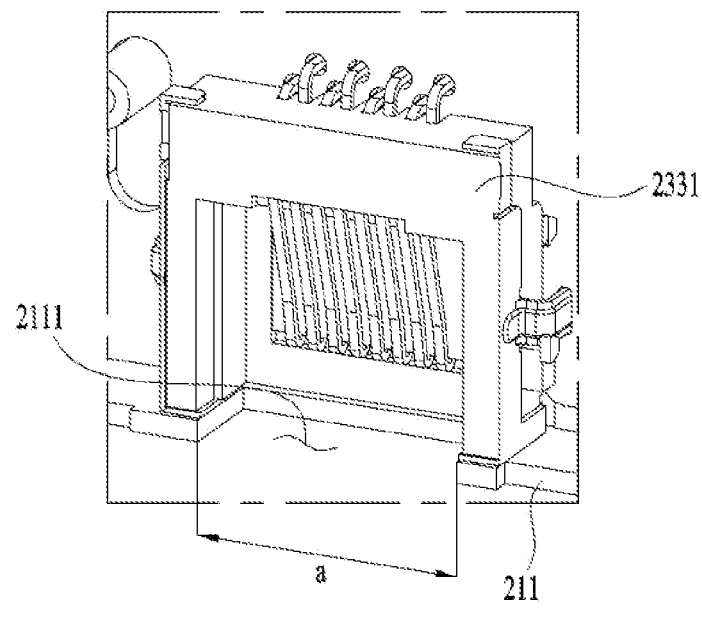
FIG. 17 is a cross-sectional diagram of a communication socket of a video camera according to the present disclosure.
Figure 17:
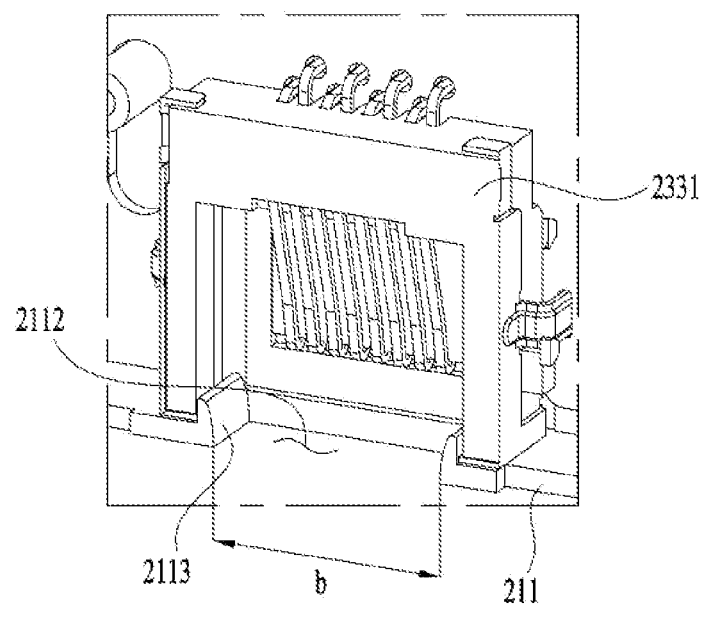
Figure 18:
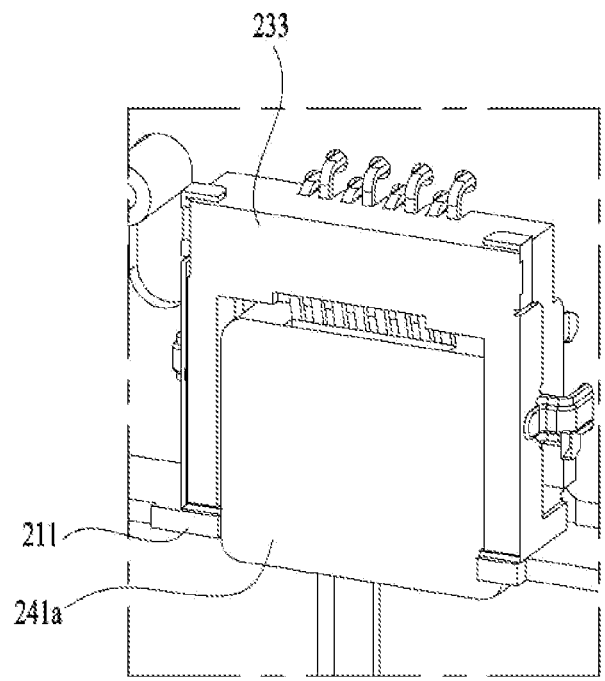
FIG. 18 is a diagram illustrating a state in which a communication plug is inserted into the communication socket of FIG. 17.
Figure 18:
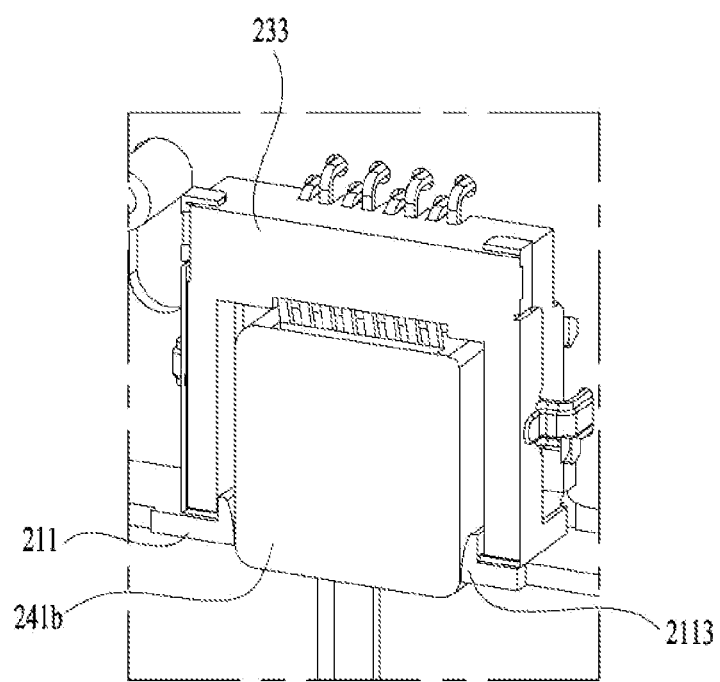

FIG. 17 is a cross-sectional diagram of a communication socket of the video camera 200 according to the present disclosure, which illustrates cross-sectional diagrams with respect to A-A and B-B lines of FIG. 16(*b*). FIG. 18 is a diagram illustrating a state in which a communication plug is inserted into the communication socket of FIG. 17. FIG. 18(*a*) shows the first communication socket 233*a* and FIG. 18(*b*) shows the second communication socket 233*b*.

Each of the first communication socket 233*a* and the second communication socket 233*b* uses the same communication socket module 2331, and the first socket hole 2111 of the first communication socket 233*a* may have a width a corresponding to the width of the communication socket 2331, but the second socket hole 212 of the second communication socket 233*b* may have the width b corresponding to the RJ12 plug 241*b* smaller than the width of the communication module (a>b).

A guide protrusion 2113, which is introduced/extended into the communication socket module 2331 in the left and right directions of the second communication hole, may be further included to fill a space separated in the lateral direction due to a width difference between the communication socket module 2331 and the second socket hole 2112.

As shown in FIG. 17(*b*), the guide protrusion 2113 may have a prescribed thickness, and the thickness may have a size corresponding to ½ of a size difference between the second socket hole 2112 and the communication socket module.

As shown in FIG. 18(*a*), a first communication plug having a size corresponding to that of the communication socket module is inserted into the first communication socket 233*a*. As shown in FIG. 18(*b*), the second communication plug 21 inserted into the second communication socket 233*b* may be supported on the left and right sides by the guide protrusion, thereby compensating for a width difference from the communication socket module.

Figure 19:
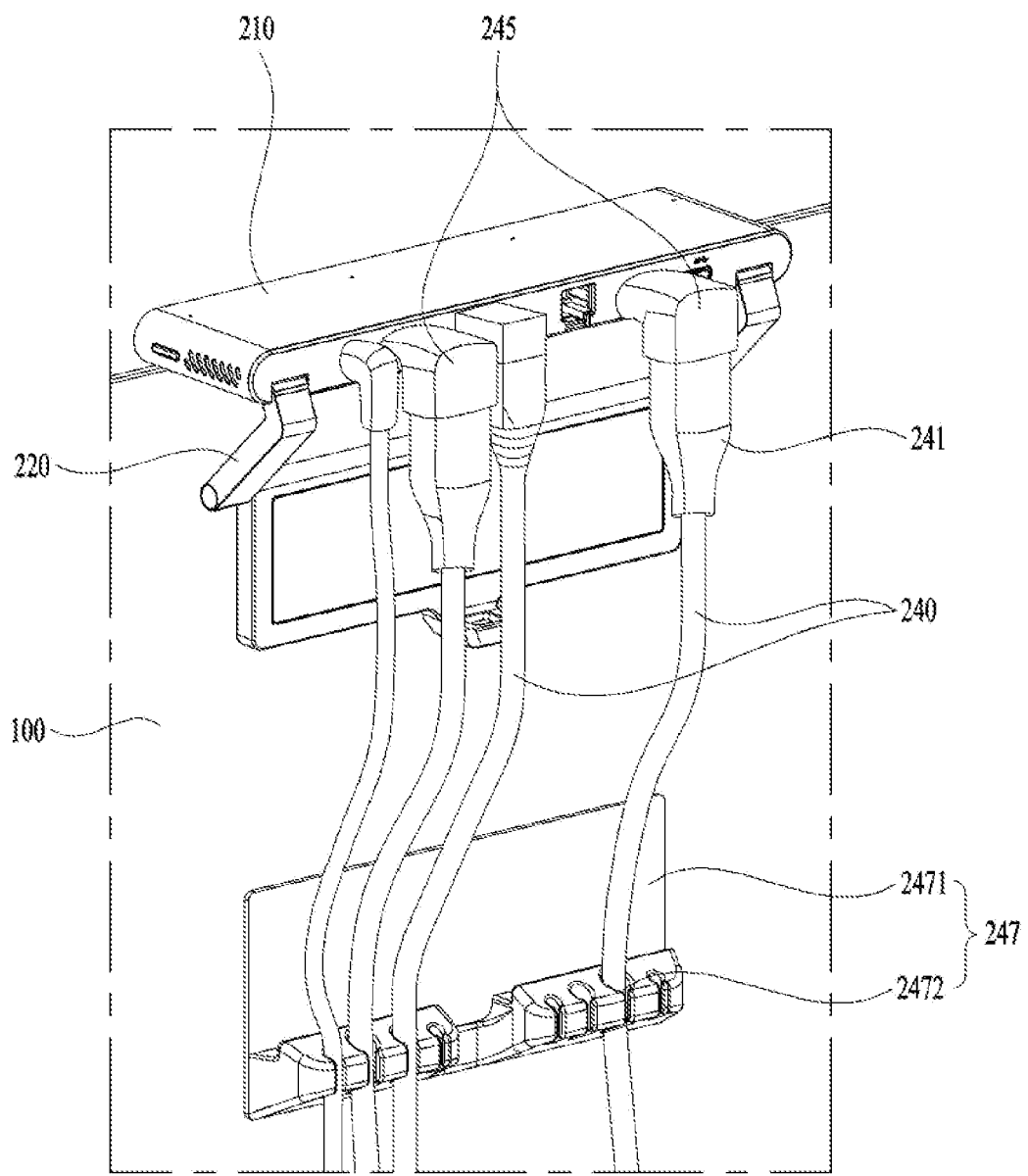
FIG. 19 is a diagram illustrating various cables and cable organizing tools coupled to a rear side of a video camera according to the present disclosure.

FIG. 19 is a diagram illustrating various cables 240 and a cable organizing tools coupled to a rear side of the video camera according to the present disclosure. As described in FIG. 6, when the cable 240 is connected to the rear side of the video camera 200, the plug 241 protrudes in the rear direction, and the center of gravity moves in the rear direction, causing the video camera 200 to lose its balance and fall backward.

To solve the above problem, as shown in FIG. 19, a connector 245 may be used to enable a direction of a socket, into which the plug 241 of the cable 240 is fitted, to face a bottom side by switching the direction of the socket by 90°. The connector 245 includes a plug part inserted into the socket in the rear side of the video camera 200 and a socket part that is disposed in a direction vertical to the plug part and into which the plug of the cable (240) can be inserted.

As shown in FIG. 19, when the video camera 200 is mounted in a form in which there is a space under the video camera 200, if a connector is used, it is able to prevent the entire center of gravity from being concentrated in the rear direction due to the increasing length in the rear direction.

A cable fixture 247 that fixes the cable 240 to prevent the weight of the cable 240 from being not directly delivered to the video camera 200 may be further included. The cable fixture 247 may have a cable holder 2472 corresponding to the thickness of the cable 240 to fix the cable 240.

The cable fixture 247 of the present disclosure is not configured to organize the cable 240 only. As the cable holder 2472 has elasticity, the cable fixture 247 may support the weight of the cable 240 by fixing the cable 240 thereto.

Since the weight of the cable 240 is not directly delivered to the video camera 200, the video camera 200 can be stably fixed and multiple cables 240 can be prevented from being tangled.

The cable fixture 247 includes an attachment surface 2471 that can be attached to the rear side of the display device 100, a wall and the like, and the weight of the cable 240 can be supported by the friction and/or adhesion force of the attachment surface 2471.

As described above, the video camera 200 of the present disclosure can be installed not only on a floor but also on a monitor or a wall, thereby facilitating installation in various places.

In addition, a front side of the camera may be selectively covered, thereby protecting the privacy of the individual.

By implementing communication sockets of different standards as a single communication socket module, types of components may be simplified.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. A video camera, comprising:
   a body housing;
   a camera module at a front side of the body housing;
   a printed circuit board located within the body housing and electrically coupled to a plurality of communication sockets; and
   a plurality of socket holes at a rear side of the body housing to expose the plurality of communication sockets, and comprising:
      a first socket hole having a width corresponding to a width of a corresponding first communication socket; and
      a second socket hole having a width smaller than that of a corresponding second communication socket,
   wherein the first communication socket and the second communication socket have equal widths, and wherein the second socket hole comprises a guide extension portion having a first portion and a second portion configured to be respectively positioned at opposing inner-facing lateral sides of the second communication socket.

2. The video camera of claim 1, wherein a thickness of each of the first and second portions of the guide extension portion corresponds to half of a difference in width between the second socket hole and the second communication socket.

3. The video camera of claim 1, further comprising a cable fixture comprising:
a plurality of cable holders configured to secure a cable connected to a plug inserted into one of the plurality of socket holes; and
an attachment surface configured to be attached to a securing surface or a display device.

4. The video camera of claim 1, further comprising a plug connector comprising a male plug portion configured to be inserted into one of the plurality of socket holes and a female socket portion shaped to correspond to the one of the plurality of socket holes and formed perpendicular to the male plug portion.

5. The video camera of claim 1, further comprising:
a camera cover configured to open or close the camera module; and
a cover slider configured to cause the camera cover to slide between an open position and a closed position, wherein the cover slider comprises:
a fixed frame fixed to the body housing;
a slide rail coupled to the fixed frame;
a slide frame configured to slide along the slide rail; and
a connecting part fastening the slide frame and the camera cover together.

6. The video camera of claim 5, further comprising an elastic part having a first side fixed to the slide frame and a second side fixed to the fixed frame,
wherein the elastic part is configured to provide an elastic force to slide the camera cover toward the open position or the closed position based on an orientation of the elastic part.

7. The video camera of claim 6, wherein the elastic part comprises a torsion spring.

8. The video camera of claim 7, wherein the orientation of the elastic part is changed by rotation of the elastic part in response to the slide frame moving past a middle position with respect to the slide rail toward the open position or the closed position of the camera cover.

9. The video camera of claim 5, further comprising:
a magnet coupled to the slide frame; and
a hall sensor positioned to correspond to the magnet when the camera cover is in the open position or the closed position.

10. The video camera of claim 5, wherein the body housing comprises a front case configured to cover the front side of the body housing,
wherein the front case comprises a slide slit through which the connecting part passes and having a length corresponding to a sliding distance of the camera cover.

11. A video camera, comprising:
a body housing;
a camera module at a front side of the body housing;
a printed circuit board located within the body housing and electrically coupled to a plurality of communication sockets; and
a plurality of socket holes at a rear side of the body housing to expose the plurality of communication sockets,
a plug connector comprising a male plug portion configured to be inserted into one of the plurality of socket holes and a female socket portion shaped to correspond to the one of the plurality of socket holes and formed perpendicular to the male plug portion,
wherein the plurality of socket holes comprises:
a first socket hole having a width corresponding to a width of a corresponding first communication socket; and
a second socket hole having a width smaller than that of a corresponding second communication socket,
wherein the first communication socket and the second communication socket have equal widths.

* * * * *